S. B. Forbes,
Cultivator Plow.
No. 88,025. Patented Mar. 23, 1869.
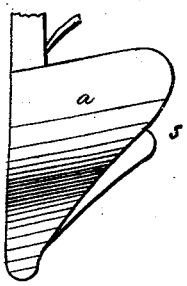
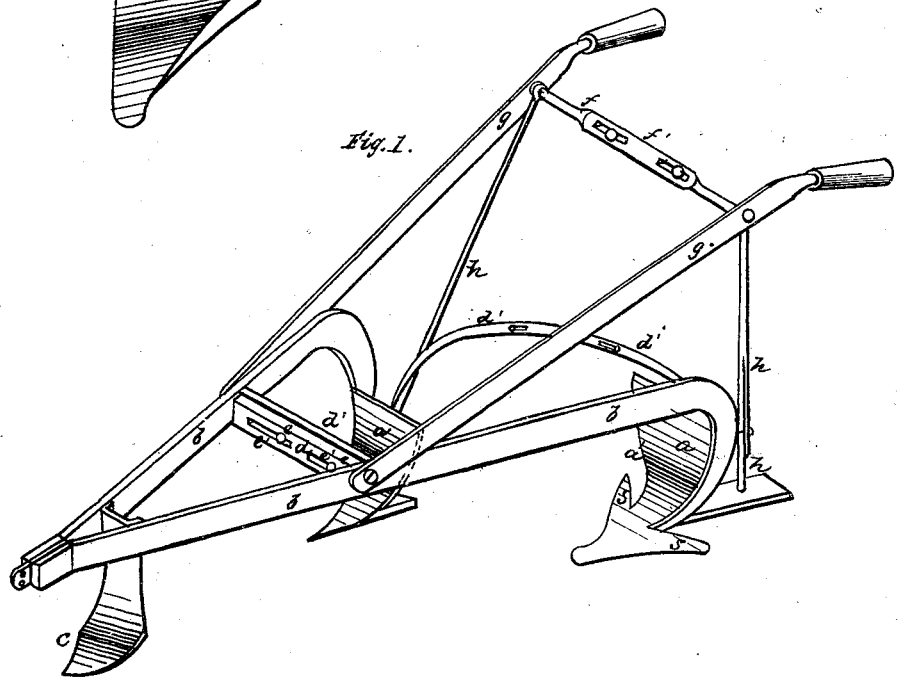
Witnesses:
Thos B Kerr.
R W Morshall
Inventor:
Simeon B. Forbes.
by Bakewell & Christy
his attys.

SIMEON B. FORBES, OF STEUBENVILLE, OHIO.

Letters Patent No. 88,025, dated March 23, 1869.

IMPROVEMENT IN CULTIVATOR-PLOWS.

The Schedule referred to in these Letters Patent and making part of the same.

*To all whom it may concern:*

Be it known that I, SIMEON B. FORBES, of Steubenville, in the county of Jefferson, and State of Ohio, have invented a new and useful Improvement in Cultivator-Plows; and I do hereby declare the following to be a full, clear, and exact description thereof, reference being had to the accompanying drawing, making a part of this specification, in which—

Figure 1 is a perspective view of a cultivator-plow, illustrating my improvement; and Figure 2 is a separate face view of my improved half shovel for a cultivator, or shovel-plow.

Like letters of reference indicate like parts in each.

The nature of my invention consists in making a half shovel for a cultivator, or shovel-plow, with or without a side-blade, cutter, or share, on either or each side of the point, and in the construction of a cultivator, or shovel-plow, with two or more such half shovels connected with adjustable beams and handles, so as to operate at greater or less distances from each other, and to a greater or less depth in the earth.

To enable others skilled in the art to make and use my invention, I will proceed to describe its construction and mode of operation.

$a\ a$ represent my improved half shovels, being made with a face concave, as it extends backward and upward, and, toward its outer edge, $a'$, inclined slightly backward, so as to throw off more easily, and in a well-mellowed condition, the soil which comes in its path.

It is so formed, also, that when attached to the beam $b$, the plane of its inner edge will be nearly or exactly vertical.

Practically, my improved shovel is a half shovel, and is an improvement on the ordinary shovel of a shovel-plow, in that it can be run close to the row of corn or other product to be tilled, and will gather all grass and weeds, and throw them away from the row, instead of merely covering them up.

It also operates more effectually than the mould-board of an ordinary plow, in that it more perfectly mellows and pulverizes the soil that comes in its path, and throws it off loosely, instead of laying it over in an unbroken furrow.

It may be set on the beams $b$, (being attached by bolts, or in other convenient way,) so as to throw the earth in the same or in opposite directions, inward or outward, or both, as may be preferred.

I use such half shovels by themselves, or combine them in a cultivator, with one or more cultivator-teeth, $c$.

Each half shovel $a$, may also be provided with side-cutters $s$, on either or both sides.

In order to be able to work the half shovels $a\ a$ at a greater or less distance from each other, I make the beams $b$ adjustable by cross-bars $d\ d'$, overlapping each other, and fastened together by bolts and nuts, $e$, passing through them in slots $e'$.

Similar bars $f\ f'$, adjustable in like manner, connect the upper ends of the handles $g$, their lower, or forward ends being bolted to the beams $b$.

Then, by loosening the nuts and bolts of the cross-bars $d\ d'$, $f\ f'$, the beams $b$ can be spread apart or drawn in, and there secured.

The rear ends of the handles $g$ are, in like manner, adjustable, up and down, by the supports $h$, which are made in separate sections, with overlapping ends, and adjustable in the manner already described.

What I claim as my invention, and desire to secure by Letters Patent, is—

1. In a cultivator-plow, a half shovel, $a$, with one or more side-cutters $s$, attached to a beam, or standard $b$, along the line of its inner, or vertical edge, substantially as hereinbefore set forth.

2. A cultivating-apparatus, having two or more half shovels $a$, connected with adjustable beams and handles, and with one or more cultivator-teeth $c$, constructed substantially as above set forth.

In testimony whereof, I, the said SIMEON B. FORBES, have hereunto set my hand.

SIMEON B. FORBES.

Witnesses:
ELL TORRANCE,
G. H. CHRISTY.